Patented Jan. 26, 1954

2,667,522

UNITED STATES PATENT OFFICE 2,667,522

NITROGEN DERIVATIVES OF TETRAACETIC ACIDS AS RUBBER STABILIZERS

John F. McElroy, Somerville, N. J., assignor to Permacel Tape Corporation, a corporation of New Jersey No Drawing. Application July 7, 1949, Serial No. 103,544

10 Claims. (Cl. 260—814)

This invention relates to stabilizers for soft rubber compounds.

Normally tacky, pressure-sensitive adhesive masses are representative of a type of rubbery compound which, as distinguished from highly vulcanized and at least partially insolubilized compositions of the type of mechanical rubber goods, is relatively soft prior to and during actual use and undergoes slight vulcanization or cure on'y in rare cases. The usual soft rubber compound is as soft and soluble as the rubber upon which it is based, and normally even softer and more soluble.

Compounds of this nature are subject to oxidation and other deteriorating influences. In the course of this oxidation the compound softens substantially at first, i. e., in the first few weeks or months of aging, and hardens thereafter progressively, soon reaching the point where the softness and tack required in adhesives and similar compounds are totally absent and where the end product becomes useless. Some extension of the useful life of soft rubber compounds is obtained with the rubber antioxidants of the prior art, but this improvement is much less pronounced in soft and soluble compounds than in the case of so-called mechanical rubber compounds which are substantially vulcanized. After such vulcanization, perhaps due to their tightly bonded, insoluble state, vulcanized mechanical rubber compounds appear substantially stabilized against most oxidative influences, if standard rubber antioxidants of the prior art are incorporated. The soft rubber compounds on the other hand remain soluble (for instance in aliphatic solvents such as normal heptane), reactive, and according'y subject to oxidation prior to and during use. In some cases soft rubber compounds lose all of their valuable properties between the time that they are made and first tested and the time at which they are to be used, sometimes in a few weeks.

This invention is based upon the discovery that oxidation of soft rubber may be substantially prevented provided that one destroys the influences of certain metals and metal compounds that have a catalytic effect upon this oxidation and particularly of copper, manganese, cobalt, nickel, and iron and their compounds. It appears that these metals or their compounds are normally present in the rubber itself, in the latex from which it is derived, and in many compounding agents that are often indispensable in soft rubber compounding, such as zinc oxide, titanium dioxide, aluminum hydrate, clay, and other mineral fillers. In some cases the catalytic effect is enhanced by contact of the soft rubber compound with metals or metal compounds during compounding, in storage, or in use.

The invention is based upon the surprising discovery that the above described catalytic effect may be minimized by addition to the soft rubber compound of an agent that reacts to form poorly ionized organic compounds with the metals that have the above mentioned catalytic effect on oxidation. In other words I have found that a group of compounds, apparently all having a tendency to react by chelation, when incorporated into the soft rubber compound, react with the metals or metal compounds that catalyze oxidation to form very poorly ionized organic metal compounds and thereby sequester the catalyzing agents, inhibit oxidation and increase the useful life of the rubber compounds over comparable compounds containing even the best antioxidants of the prior art.

The preferred chelating agents of the invention are derivatives of ammonia, commonly called aminoacetic acids, wherein at least one and preferably more than one of the hydrogens in ammonia is replaced by a group having the methyl carboxy radical, their salts and ethers. One hydrogen may also be replaced by an alkyl amine or by a compound having an alkyl amine methyl carboxy radical and preferably having two methyl carboxy radicals. Thus the simplest compound within this group is aminoacetic acid

[NH$_2$CH$_2$COOH]

and more complex compounds are aminodiacetic acid [NH(CH$_2$COOH)$_2$] amino triacetic acid [N(CH$_2$COOH)$_3$] ethylene diamine diacetic acid [C$_2$H$_4$(NHCH$_2$COOH)$_2$] and related compounds such as ethylene diamine tetraacetic acid

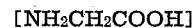
C$_2$H$_4$N$_2$(CH$_2$COOH)$_4$

The alkyl chains in these compounds may be materially longer than in the last mentioned case, as for instance in the case of butylene diamine acetic acid [H$_2$NC$_4$H$_8$N(CH$_2$COOH)$_2$]. Instead of acids their salts and esters may be used, for instance the mono-N-butyl amine salt of ethylene diamine tetraacetic acid.

[C$_4$H$_5$NH$_2$OOC (C$_2$H$_4$N$_2$) (CH$_2$COOH)$_3$]

or esters. It appears that the location within the molecule and size of the alkyl chains in these compounds is not of great importance as far as their oxidation inhibiting properties are concerned and that satisfactory results may be obtained by using any compounds having any desired number of carboxyl radicals, including particularly acids, amine salts and also salts based on monovalent alkali metals, i. e. sodium, potassium and lithium.

Among preferred materials within this group are any of the amine salts of the ethylene diamine polyacetic acids such as the diethyl amine salt and the butyl amine salts, and the univalent alkali metal salts of these acids, such as the sodium, potassium and lithium salts. Any of the esters may be used but butyl ester is preferred. The alkyl and alkylene chains in the molecules may be short as in the case of the ethyl esters and ethyl amine salts or quite long as in the case of the octyl and diethylene esters and octyl amine salts. Chains of intermediate length also serve satisfactorily. Di-, tri-, or tetra-acetates may be used in this invention and nitrilotriacetic acid and its esters and salts are well suited for its purposes. The preferred amino acetates stain materials that they contact only very little or not at all.

Within the abovementioned concepts the invention is broad and includes the use of all compounds belonging to this group preferably in amounts of 0.05-10 per cent of the weight of the total composition depending upon the stability that is desired and the amount of catalytic metal or metal compound that the soft rubber compound either contains or contacts during normal use. For satisfactory aging, 0.2-2 per cent of the chelating agent is used normally. Smaller amounts cause some improvement but are considered insufficient for many purposes. Amounts larger than 2 per cent are desirable in some cases where the soft rubber compound is to be used in direct contact with a substantial amount of metal or metals catalyzing oxidation but the excess over two per cent does not extend the life of the soft rubber compound materially in other cases.

To illustrate representative embodiments of the invention by way of example only, but not to limit the scope of the invention in any way, several examples of preferred embodiments are described below. The amounts of ingredients in all these examples are given as parts by weight of the soft and soluble rubber compounds.

EXAMPLE I

| | |
|---|---|
| Natural raw rubber (e. g. smoked sheet) | 100 |
| Lanolin | 10 |
| Hydrated alumina | 40 |
| Polybetapinene (melting point, 115° C.) | 85 |
| Hydroquinone n-benzyl ether (standard antioxidant) | 2 |
| Potassium salt of ethylene diamine tetraacetic acid | 2 |

The above ingredients were incorporated on a rubber mill in the usual manner until a homogeneous blend was obtained. Alternatively, the ingredients may be blended in an internal mixer after preliminary milling of the rubber causes them to blend more readily. The soft and soluble rubber compound formed a satisfactory normally tacky and pressure sensitive adhesive mass and had a considerably more uniform useful life than corresponding products comprising either no antioxidant whatsoever or only standard antioxidants of the prior art.

It could be applied to any backing from solvent solution or dispersion using aliphatic or aromatic solvents, and/or by heat using a hot melt spreader or calender. Several other examples using widely varied amino acetic acid materials and other ingredients and which may be processed as above are shown in the table that follows:

*Table of examples*

| Components of the formulae | II | III | IV | V | VI | VII | VIII | IX | X | XI | XII | XIII |
|---|---|---|---|---|---|---|---|---|---|---|---|---|
| Butadiene (66%)=acrylonitrile (34%) copolymer [1] | 100 | | | | | | | | | | | 50 |
| Butadiene (50%)=styrene (50%) copolymer [1] | | 100 | | | | | | | | | | 50 |
| Factice, white | | | 50 | | | | | | | | | |
| Polyisobutylene (molecular weight approximately 100,000) | | | | 25 | | | | | | | | |
| Rubber, raw natural | | | 100 | 100 | 100 | 100 | 100 | 100 | 100 | 70 | 50 | |
| Rubber, reclaim, devulcanized (60% rubber hydrocarbon) | | | | | | | | | | 50 | | |
| Rubber, reprocessed natural, unvulcanized | | | | | | | | | | | 50 | |
| Coumarone-indene resin (melting point, 80° C.) | | | 20 | | | | | | | | | |
| Polybetapinene (M. P., 115° C.) | | | 70 | 50 | | | 85 | | 90 | | | |
| Rosin (M. P., 120° C.) | | | | 15 | | | | | | | | |
| Rosin, dehydrogenated (M. P., 62° C.) | | | | | 80 | | | 80 | | | | |
| Rosin, hydrogenated (M. P., 110° C.) | | | | | | | | | | 90 | | |
| Rosin, hydrogenated, glyceride of (M. P., 120° C.) | | | | | | 80 | | | | | 80 | |
| Lanolin | | | | | 10 | 10 | | | | 5 | | |
| Mineral oil | | | 15 | | | | | | | | | |
| Naphthenic oil | | | | | | | | | | 15 | | |
| Paraffin oil | | | | | | | | | 10 | | | |
| Petroleum jelly | | | | | | | | | | | 15 | |
| Alumina, hydrated | | | | | | | 40 | | 30 | | | |
| Calcium carbonate | | | | | | | | | | 30 | | |
| Clay, finely divided | | | | 10 | | | | | | | 20 | |
| Titanium dioxide | | | | 10 | | | | | | | | |
| Zinc oxide | | | | | | | | 50 | | | | |
| Polyhydroxy amyl phenol (M. P., 165° C.) | | | | | | | | 2 | | | | |
| n-Butyl ester of ethylene diamine tetraacetic acid | | | 4 | | | | | | | | | |
| Diethyl amine salt of propylene diamine tetraacetic acid | | | | 5 | | | | | | | | |
| Ethylene diamine triacetic acid | | | | | 5 | | | | | | | |
| Ethylene diamine tetraacetic acid | | | | | | 2 | | | | | | |
| Mono-n-butyl amine salt of ethylene diamine tetraacetic acid | | | | | | | 2 | | | | | |
| Mono-n-pentyl amine salt of nitrilo-triacetic acid | | | | | | | | 3 | | | | |
| Tetrasodium salt of ethylene diamine tetraacetic acid | 0.5 | | | | | | | | | 1 | | 0.3 |
| Triethanol amine salt of ethylene diamine tetraacetic acid | | | | | | | | | | | 3 | |
| Trisodium salt of ethylene diamine tetraacetic acid | | 1.5 | | | | | | | | | 5 | |

[1] These polymers were used in the disperse form of their latices (35% solids) as impregnants for 27-pound per ream porous toweling paper. The parts given are parts of solids by weight. The chelating agents were incorporated from aqueous solution into the latices. The weight of dry impregnant in the finished impregnated product equalled the weight of the original paper.

In all of the above mentioned examples substantial improvements were obtained in the aging of the soft and soluble rubber compounds over equivalent compounds free of the amino acetate materials.

As many of the compounds listed in the preceding examples are typical normally tacky and pressure-sensitive adhesives, it should be mentioned here that such adhesives may comprise 25–90 per cent by weight of at least one rubber, which may be natural or synthetic, 0–70 per cent of at least one tackifying or other compatible resin, 0–40 per cent liquid or waxy plasticizer material, 0–80 per cent filler material, and 0–10 per cent of any standard antioxidant other than of the type of the invention. For best adhesiveness the corresponding limits are 25–75 per cent of rubber material, 10–50 per cent tackifying resin material, 0–20 per cent liquid or waxy plasticizer material, 0–50 per cent filler material, and 0–5 per cent standard antioxidant.

To illustrate the specific effect of typical above described agents on soft rubber compounds, a number of such agents were incorporated in compositions of the following formula:

| | |
|---|---|
| Natural rubber | 50 |
| Polybetapinene (melting point, 115° C.) | 35 |
| Chelating agent under test | 6 |
| Anhydrous copper sulfate to provide catalytic oxidation effect | 0.05 |

A comparison of copper deterioration of soft rubber compounds with and without typical chelating agents of the invention follows:

Table II

| Chelating Agent Added | Number of days after which soft rubber compound started to deteriorate (soften substantially) in accelerated aging at 150° F.[1] |
|---|---|
| None | 6. |
| Mono-n-butylamine salt of ethylene diamine tetraacetic acid. | More than 90. |
| Sodium salt of ethylene diamine tetraacetic acid modified by a large excess of hydrogenated rosin glyceride. | More than 84. |
| Diethyl amine salt of ethylene diamine tetraacetic acid. | More than 90. |
| Ethylene diamine tetraacetic acid | 78. |
| n-Butyl ester of ethylene diamine | 54. |
| Triethanol amine salt of ethylene diamine tetraacetic acid. | 42. |

[1] One week of accelerated aging is comparable to several months of aging at normal temperatures.

In these experiments the materials were considered deteriorated as soon as substantial softening and stringiness became noticeable by observation and "feel" of the composition during weekly inspection.

Many other variations of the above described invention will be apparent to those skilled in the art and will be included in the inventive concept.

I claim:

1. A composition comprising rubber in its soft and soluble substantially unvulcanized state and from about 0.05 to about ten per cent by weight of the composition of the diethyl amine salt of ethylene diamine tetraacetic acid.

2. A composition comprising a rubber selected from the group consisting of natural rubber and the copolymers of butadiene and acrylonitrile and butadiene and styrene in its soft and soluble, substantially unvulcanized state, and from about 0.05 to about ten per cent by weight of the composition of the mono-n-butylamine salt of ethylene diamine tetraacetic acid.

3. A composition comprising a rubber selected from the group consisting of natural rubber and the copolymers of butadiene and acrylonitrile and butadiene and styrene in its soft and soluble, substantially unvulcanized state, and from about 0.05 to about ten per cent by weight of the composition of an amine salt of ethylene diamine tetraacetic acid.

4. A composition comprising a rubber selected from the group consisting of natural rubber and the copolymers of butadiene and acrylonitrile and butadiene and styrene in its soft and soluble substantially unvulcanized state and a minor proportion by weight of the composition of an amine salt of an ethylene polyacetic acid.

5. A composition comprising a rubber selected from the group consisting of natural rubber and the copolymers of butadiene and acrylonitrile and butadiene and styrene in its soft and soluble, substantially unvulcanized state and a minor proportion by weight of the composition of a diethyl amine salt of an ethylene polyamine polyacetic acid.

6. A composition comprising a rubber selected from the group consisting of natural rubber and the copolymers of butadiene and acrylonitrile and butadiene and styrene in its soft and soluble, substantially unvulcanized state and a minor proportion by weight of the composition of a butyl amine salt of an ethylene polyamine polyacetic acid.

7. A composition comprising a rubber selected from the group consisting of natural rubber and the copolymers of butadiene and acrylonitrile and butadiene and styrene in its soft and soluble, substantially unvulcanized state and from about 0.05 to about ten per cent by weight of the composition of a sodium salt of ethylene diamine tetraacetic acid.

8. A composition comprising a rubber selected from the group consisting of natural rubber and the copolymers of butadiene and acrylonitrile and butadiene and styrene in its soft and soluble, substantially unvulcanized state and from about 0.05 to about ten per cent by weight of the composition of the salt of ethylene diamine tetraacetic acid and a univalent alkali metal.

9. A composition comprising a rubber selected from the group consisting of natural rubber and the copolymers of butadiene and acrylonitrile and butadiene and styrene in its soft and soluble, substantially unvulcanized state and from about 0.05 to about ten per cent by weight of the composition of at least one compound of the formula

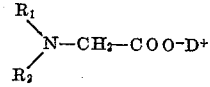

wherein $R_1$ is selected from the group consisting of —H; —CH$_2$COO$^-$D$^+$; and $$(CH_2)_xNR_3—CH_2COO^-D^+$$

wherein $R_2$ and $R_3$ each are selected from the group consisting of —H; —CH$_2$COO$^-$D$^+$; and CH$_2$COOR$_4$ wherein $R_4$ is an alkyl radical having from two to five carbon atoms in the chain; wherein D is a cation selected from the group consisting of H$^+$, Na$^+$, K$^+$, Li$^+$, NH$_4^+$, and NH$^+$A$_3$; wherein A is at least one of the members of the group consisting of hydrogen, alkyl and ethanol; and wherein $x$ is at least 2 and not more than 4.

10. A composition comprising a rubber selected from the group consisting of natural rubber and the copolymers of butadiene and acrylonitrile and butadiene and styrene in its soft and soluble, substantially unvulcanized state and from about 0.2 to about two per cent by weight of the composition of at least one compound of the formula

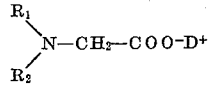

wherein $R_1$ is selected from the group consisting of $-H$; $-CH_2COO^-D^+$; and

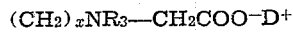

wherein $R_2$ and $R_3$ each are selected from the group consisting of $-H$; $-CH_2COO^-D^+$; and $CH_2COOR_4$ wherein $R_4$ is an alkyl radical having from two to five carbon atoms in the chain; wherein D is a cation selected from the group consisting of $H^+$, $Na^+$, $K^+$, $Li^+$, $NH_4^+$, and $NH^+A_3$; wherein A is at least one of the members of the group consisting of hydrogen, alkyl and ethanol; and wherein $x$ is at least 2 and not more than 4.

JOHN F. McELROY.

References Cited in the file of this patent
UNITED STATES PATENTS

| Number | Name | Date |
|---|---|---|
| 1,988,005 | Gilbert et al. | Jan. 15, 1935 |
| 2,143,455 | Sibley | Jan. 10, 1939 |
| 2,181,121 | Downing et al. | Nov. 28, 1939 |
| 2,363,777 | Downing et al. | Nov. 28, 1944 |
| 2,371,736 | Carson | Mar. 20, 1945 |
| 2,558,728 | Britton et al. | July 3, 1951 |
| 2,560,744 | Rhines | July 17, 1951 |